(12) United States Patent
Aono et al.

(10) Patent No.: US 12,500,248 B2
(45) Date of Patent: Dec. 16, 2025

(54) SEPARATOR FOR FUEL CELL

(71) Applicant: TOYOTA BOSHOKU KABUSHIKI KAISHA, Aichi-ken (JP)

(72) Inventors: Haruyuki Aono, Aichi-ken (JP); Satoshi Kawabe, Ichinomiya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 516 days.

(21) Appl. No.: 17/891,783

(22) Filed: Aug. 19, 2022

(65) Prior Publication Data

US 2023/0066147 A1   Mar. 2, 2023

(30) Foreign Application Priority Data

Aug. 24, 2021  (JP) .................................. 2021-136428

(51) Int. Cl.
*H01M 8/026* (2016.01)
*H01M 8/0254* (2016.01)
(Continued)

(52) U.S. Cl.
CPC ......... *H01M 8/026* (2013.01); *H01M 8/0254* (2013.01); *H01M 8/0258* (2013.01);
(Continued)

(58) Field of Classification Search
None
See application file for complete search history.

(56) References Cited

U.S. PATENT DOCUMENTS 6,586,128 B1 *  7/2003  Johnson ............... H01M 8/0265
                                                        429/513
2009/0162717 A1 *  6/2009  Nakagawa .......... H01M 8/1007
                                                        429/456
(Continued)

FOREIGN PATENT DOCUMENTS

JP   2008282777 A  * 11/2008
JP   2013222698 A  * 10/2013
JP   2018-078020 A    5/2018

OTHER PUBLICATIONS

Machine English translation of JP-2013222698-A from Espacenet originally published to Chiba Oct. 28, 2013 (Year: 2013).*

(Continued)

*Primary Examiner* — Ula C Ruddock
*Assistant Examiner* — Mary Grace Byram
(74) *Attorney, Agent, or Firm* — Greenblum & Bernstein, P.L.C.

(57) ABSTRACT

A separator for a fuel cell includes a contact surface. Groove passages are arranged side by side in the contact surface. The groove passages include a first groove passage and a second groove passage that are adjacent to each other in an arrangement direction of the groove passages. The contact surface includes a rib located between the first groove passage and the second groove passage. The rib includes at least one wide section. The first groove passage includes at least one first contiguous section that is adjacent to the at least one wide section. The second groove passage includes at least one second contiguous section that is adjacent to the at least one wide section. A cross-sectional flow area of the first contiguous section is less than a cross-sectional flow area of the second contiguous section.

4 Claims, 5 Drawing Sheets

(51) Int. Cl.
*H01M 8/0258* (2016.01)
*H01M 8/0263* (2016.01)
*H01M 8/0265* (2016.01)
*H01M 8/0267* (2016.01)
*H01M 8/2483* (2016.01)
*H01M 8/10* (2016.01)

(52) U.S. Cl.
CPC ....... *H01M 8/0263* (2013.01); *H01M 8/0265* (2013.01); *H01M 8/0267* (2013.01); *H01M 8/2483* (2016.02); *H01M 2008/1095* (2013.01)

(56) References Cited

U.S. PATENT DOCUMENTS

2018/0131013 A1   5/2018   Nonoyama et al.
2019/0305326 A1*  10/2019  Nonoyama ........... H01M 8/026
2019/0305327 A1*  10/2019  Okabe ................ H01M 8/0263

OTHER PUBLICATIONS

Machine English translation of JP2008282777A from Espacenet originally published to Takase Nov. 20, 2008 (Year: 2008).*
Japanese Office Action in counterpart Japanese Application No. 2021-136428, dated Dec. 24, 2024, along with English.

* cited by examiner

SEPARATOR FOR FUEL CELL

BACKGROUND

1. Field

The present disclosure relates to a separator for a fuel cell.

2. Description of Related Art

Japanese Laid-Open Patent Publication No. 2018-78020 discloses a single cell used in a fuel cell stack. The single cell includes a membrane electrode assembly (hereinafter, referred to as MEA), a first separator, and a second separator. The first and second separators hold the MEA between them.

The MEA includes a catalyst coated membrane (hereinafter, referred to as CCM) and gas diffusion layers (hereinafter, referred to as GDL). The CCM includes an electrolyte membrane and a catalyst layer. The gas diffusion layers are respectively provided on opposite sides of the CCM.

The first separator includes first groove passages for oxidation gas and cooling groove passages for cooling medium. The first groove passages each extend in a straight line and are formed in a surface of the first separator that faces the MEA. The shapes of protrusions and recesses of the first groove passages on one side of the first separator and the shapes of recesses and protrusions of the cooling groove passages on the opposite side of the first separator conform to each other.

The second separator includes second groove passages for fuel gas and cooling groove passages for cooling medium. The second groove passages each have a wavy shape and are formed in a surface of the second separator that faces the MEA. The shapes of protrusions and recesses of the second groove passages on one side of the second separator and the shapes of recesses and protrusions of the cooling groove passages on the opposite side of the second separator conform to each other. The amplitude of each second groove passage is set such that the second groove passage overlaps with protrusions on the back side of first groove passages in the first separator, which faces the second separator.

This type of single cell allows oxidation gas to gradually permeate into the GDL adjacent to the first separator while flowing through the first groove passages of the first separator. This type of single cell also allows fuel gas to gradually permeate into the GDL adjacent to the second separator while flowing through the second groove passages of the second separator. Power is generated in the CCM through an electrochemical reaction between the oxidation gas and the fuel gas, which have permeated into the GDLs.

When such single cells are stacked, the protrusions of the second groove passages in one of the single cells and the protrusions of the back side of the first groove passage in another cell are in contact with each other over a relatively large area. This improves the stability of the contacting structure of the adjacent separators and thus improves the stability of the contacting structure of the single cells.

It is desired that, in such a single cell, fuel gas permeate into a wider area of the GDL efficiently in order to increase power generation efficiency.

Such objectives are not unique to separators having groove passages for fuel gas, but also apply to separators having groove passages for oxidation gas.

SUMMARY

It is an objective of the present disclosure to provide a separator for a fuel cell that allows reactant gas to efficiently permeate into a wide area in a gas diffusion layer.

In one general aspect, a separator for a fuel cell is provided. The separator includes a contact surface configured to contact a power generating unit of the fuel cell. Groove passages through which a reactant gas flows are arranged side by side on the contact surface. A direction in which the groove passages are arranged side by side is defined as an arrangement direction. The groove passages include a first groove passage and a second groove passage that extend in wavy shapes in planar directions of the contact surface and are adjacent to each other in the arrangement direction. The contact surface includes a rib that is located between the first groove passage and the second groove passage and contacts the power generating unit. The rib includes at least one wide section of which a width in the arrangement direction is greater than those of other sections of the rib. The first groove passage includes at least one first contiguous section that is contiguous to the at least one wide section. The second groove passage includes at least one second contiguous section that is contiguous to the at least one wide section. A cross-sectional flow area of the first contiguous section is less than a cross-sectional flow area of the second contiguous section.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A separator 30 for a fuel cell according to one embodiment will now be described with reference to FIGS. 1 to 10.

<Overall Configuration of Single Cell of Fuel Cell Stack>

Figure 1:
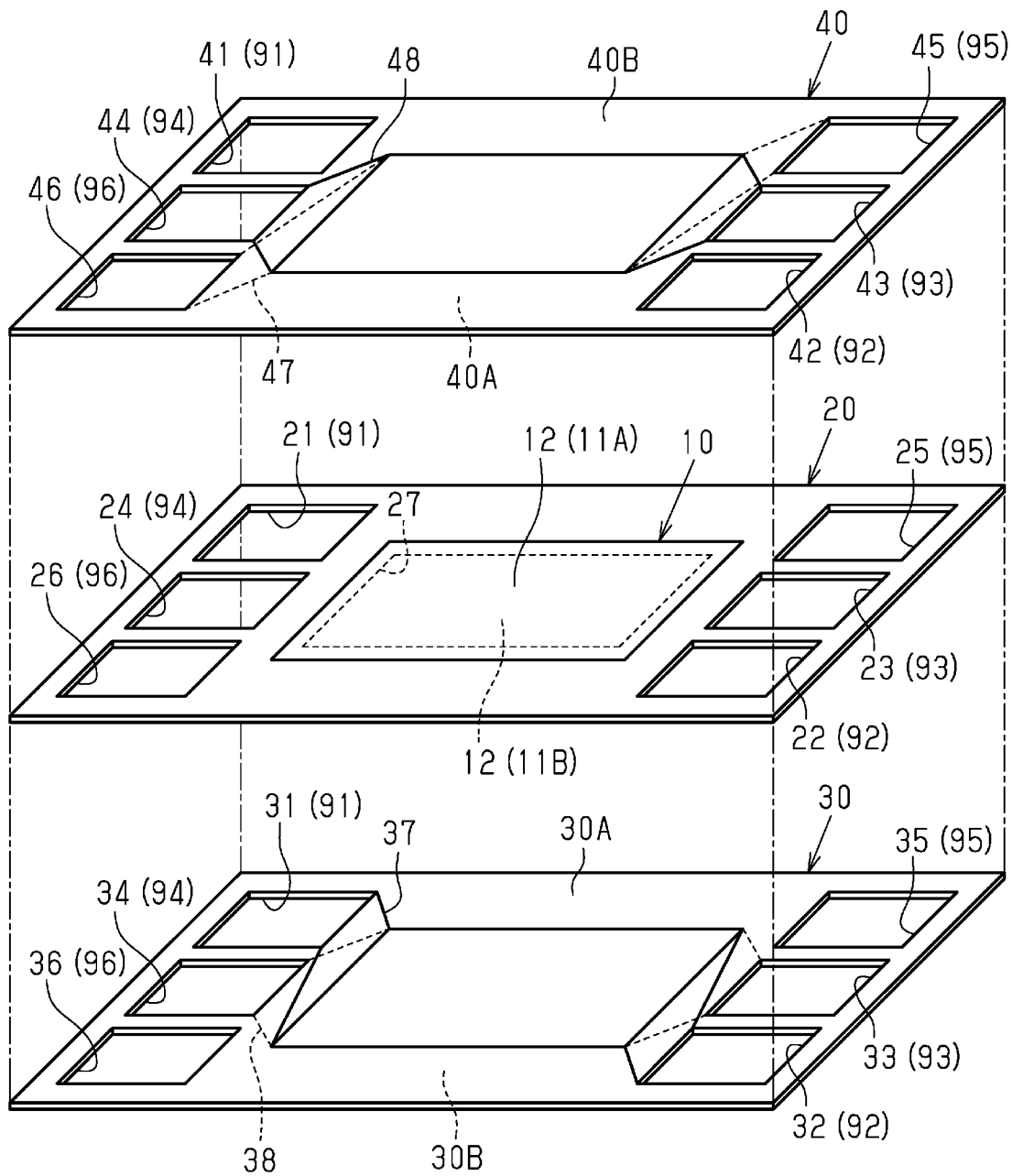
FIG. 1 is an exploded perspective view of a single cell for a fuel cell that includes separators for a fuel cell according to one embodiment.
Figure 1:
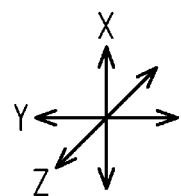

As shown in FIG. 1, a single cell for a fuel cell stack includes a membrane electrode assembly 10 (hereinafter, referred to as MEA 10), a frame member 20, which supports the MEA 10, and two separators 30, 40, which hold the MEA 10 and the frame member 20 between them.

The single cell is a rectangular plate as a whole.

In the following description, the direction in which the separator 30, the layer including the MEA 10 and the frame member 20, and the separator 40 are stacked will be referred to as a first direction X.

A longitudinal direction of the single cell, which is orthogonal to the first direction X, will be referred to as a second direction Y.

Also, a direction that is orthogonal to both of the first direction X and the second direction Y will be referred to as a third direction Z.

The single cell has inlet holes 91, 93, 95 for introducing reactant gas or cooling medium into the single cell and outlet holes 92, 94, 96 for discharging the reactant gas and the cooling medium in the single cell to the outside. In the present embodiment, the inlet hole 91 and the outlet hole 92 are holes through which fuel gas flows. The inlet hole 93 and the outlet hole 94 are holes through which cooling medium flows. The inlet hole 95 and the outlet hole 96 are holes through which oxidant gas flows. The fuel gas is hydrogen gas. The cooling medium is water. The oxidant gas is air.

The inlet holes 91, 93, 95 and the outlet holes 92, 94, 96 each have a rectangular shape elongated in the second direction Y in plan view, and extend in the first direction X through the single cell. The inlet hole 91 and the outlet holes 94, 96 are located on one side in the second direction Y of the single cell (on the left side in the left-right direction in FIG. 1). The inlet hole 91 and the outlet holes 94, 96 are arranged side by side in the third direction Z while being spaced apart from each other. The outlet hole 92 and the inlet holes 93, 95 are located on the other side in the second direction Y (on the right side in FIG. 1). The outlet hole 92 and the inlet holes 93, 95 are arranged side by side in the third direction Z while being spaced apart from each other.

<MEA 10>

As shown in FIG. 1, the MEA 10 has a rectangular shape elongated in the second direction Y.

The MEA 10 includes a solid polymer electrolyte membrane (not shown; hereinafter referred to as an electrolyte membrane) and electrodes 11A, 11B respectively provided on opposite surfaces of the electrolyte membrane. In the present embodiment, the electrode that is joined to one side in the first direction X (the upper side in the up-down direction in FIG. 1) of the electrolyte membrane (not shown) is a cathode 11A. Also, the electrode joined to the other side in the first direction X (the lower side in the in FIG. 1) of the electrolyte membrane is an anode 11B.

The electrodes 11A, 11B each include a catalyst layer (not shown) joined to the electrolyte membrane and a gas diffusion layer 12 (hereinafter referred to as a GDL 12), which is joined to the catalyst layer.

The MEA 10 corresponds to a power generating unit of the fuel cell according to the present disclosure.

<Frame Member 20>

As shown in FIG. 1, the frame member 20 has a rectangular shape elongated in the second direction Y.

The frame member 20 is made of, for example, a hard plastic.

The frame member 20 includes through-holes 21, 22, 23, 24, 25, 26, which are respectively part of the holes 91, 92, 93, 94, 95, 96.

The frame member 20 includes an opening 27, which has a rectangular shape elongated in the second direction Y, in a center. The MEA 10 is joined to the edge of the opening 27 from one side in the first direction X (upper side as viewed in FIG. 1).

<Separator 30>

As shown in FIG. 1, the separator 30 is a rectangular plate elongated in the second direction Y.

The separator 30 is formed by pressing, for example, a metal member made of titanium or stainless steel.

The separator 30 is provided on the side of the MEA 10 on which the anode 11B is provided. The separator 30 includes a first surface 30A and a second surface 30B, which is on a side opposite to the first surface 30A. The first surface 30A includes a contact surface 30a, which contacts the MEA 10 (refer to FIG. 2).

The separator 30 includes through-holes 31, 32, 33, 34, 35, 36, which are respectively part of the holes 91, 92, 93, 94, 95, 96. In the third direction Z, the through-holes 31, 34, 36 are provided at positions that correspond to the through-holes 21, 24, 26 of the frame member 20. Also, in the third direction Z, the through-holes 32, 33, 35 are provided at positions that correspond to the through-holes 22, 23, 25 of the frame member 20.

The separator 30 includes groove passages 37 through which fuel gas flows and groove passages 38 through which cooling medium flows. FIG. 1 illustrates, in a simplified manner, the outer edge of a section in the separator 30 that includes the groove passages 37 and the outer edge of a section in the separator 30 that includes the groove passages 38.

<Groove Passages 37, 38>

Figure 2:
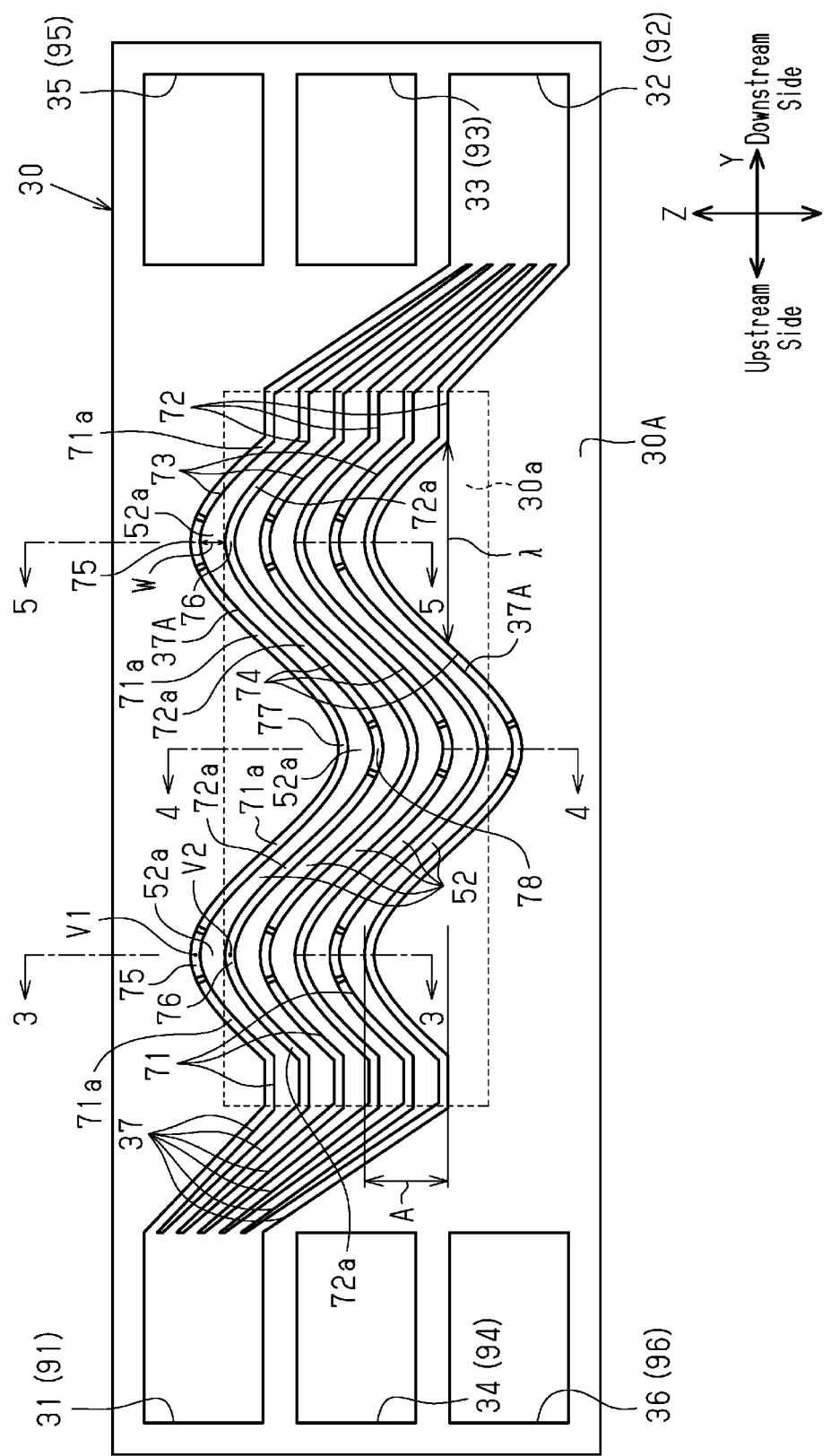
FIG. 2 is a plan view of a separator according to the embodiment, illustrating groove passages through which fuel gas flows.

As shown in FIG. 2, the groove passages 37 connect the through-hole 31 and the through-hole 32 to each other, and are provided in the first surface 30A. In the present embodiment, the groove passages 37, of which there are six, are arranged side by side in the third direction Z while being spaced apart from each other. That is, the six groove passages 37 are independent from one another.

In the following description, an upstream portion and a downstream portion in the flow direction of fuel gas in the groove passages 37 will simply be referred to as an upstream portion and a downstream portion, respectively. The upstream side of the flow direction corresponds to one side in the second direction Y (the left side in the left-right direction in FIG. 2). Also, the downstream side of the flow direction corresponds to the other side in the second direction Y (the right side in FIG. 2).

The width of each groove passage 37 is constant over the entire groove passage 37 in the extending direction. The groove passages 37 have the same width.

The six groove passages 37 include three first groove passages 71 and three second groove passages 72. The first groove passages 71 and the second groove passages 72 alternate in the third direction Z.

Each first groove passage 71 includes a wavy section 73. The wavy sections 73 are provided in the contact surface 30a and extend in wavy shapes in planar directions of the contact surface 30a. In the present embodiment, each wavy section 73 has the shape of a sine wave of which a wavelength λ and an amplitude A are constant over the entire wavy section 73 in the extending direction. The wavenumber of each wavy section 73 is three.

Each second groove passage 72 includes a wavy section 74. The wavy sections 74 are provided in the contact surface 30a and extend in wavy shapes in planar directions of the contact surface 30a. In the present embodiment, the wavy section 74 has the same waveform as the wavy section 73.

Figure 3:
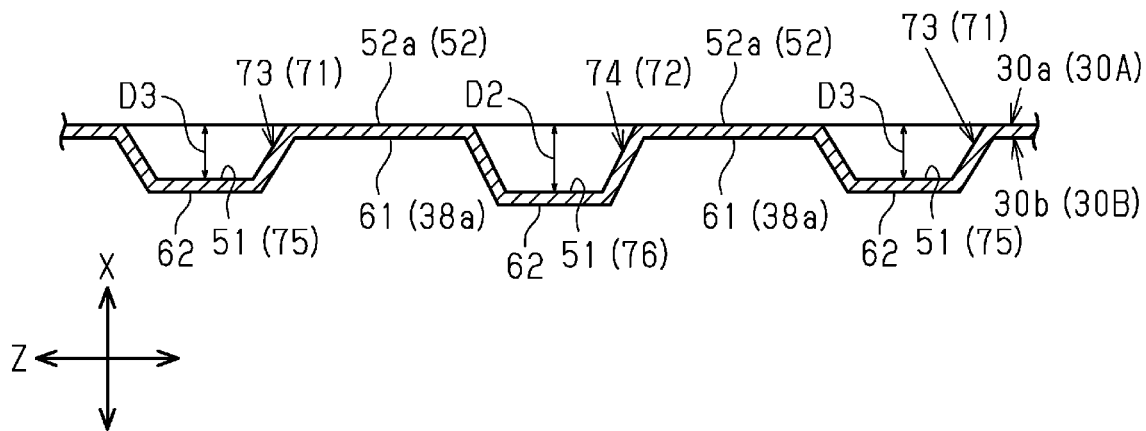
FIG. 3 is a cross-sectional view taken along line 3-3 of FIG. 2.
Figure 4:
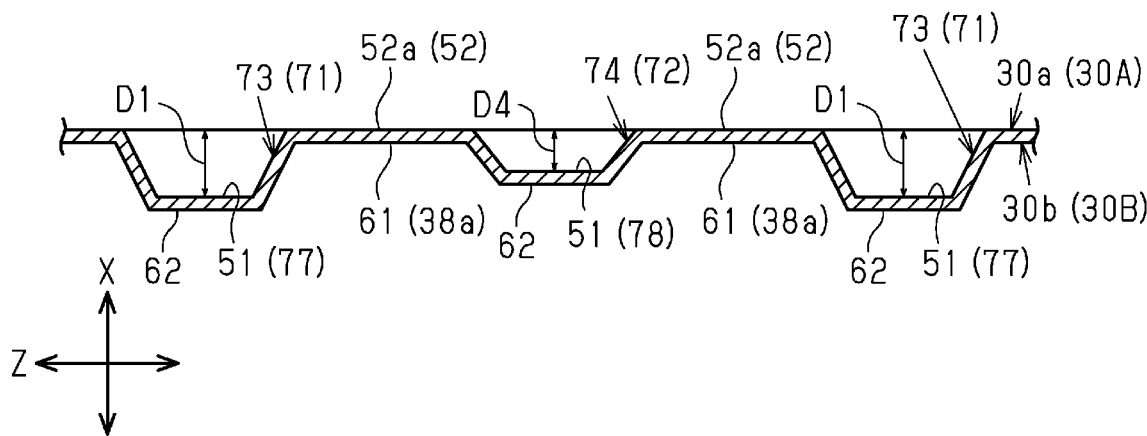
FIG. 4 is a cross-sectional view taken along line 4-4 of FIG. 2.
Figure 5:
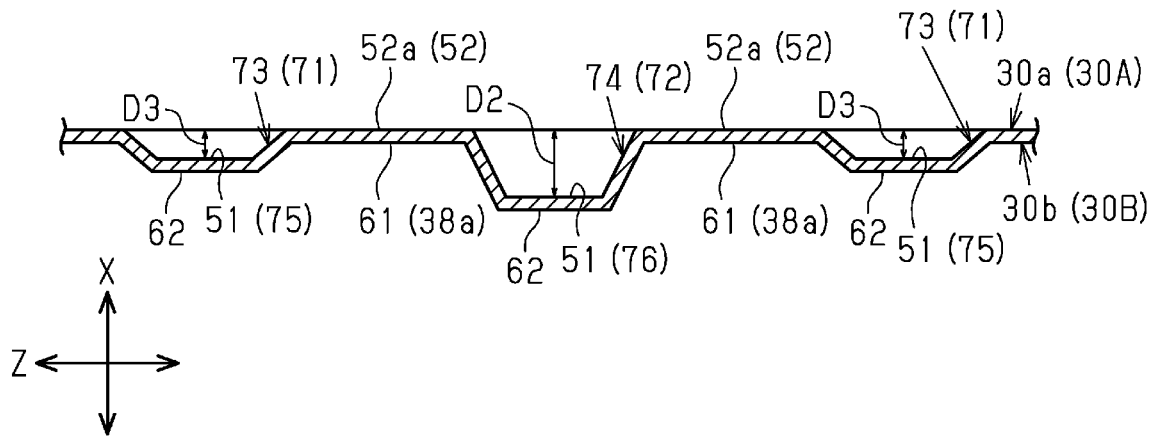
FIG. 5 is a cross-sectional view taken along line 5-5 of FIG. 2.

As shown in FIGS. 3 to 5, the groove passages 71, 72 include recesses 51 formed in the first surface 30A of the separator 30. Ribs 52, which are protrusions, are provided between the recesses 51 that are adjacent to each other in the third direction Z. Protruding ends of the ribs 52 are in contact with the GDL 12 of the MEA 10, which is contiguous to the separator 30 (refer to FIGS. 9 and 10).

As shown in FIG. 2, each rib 52 includes wide sections 52a between the wavy section 73 and the wavy section 74. Each wide section 52a has a width W in the third direction Z that is greater than those of other sections between the wavy section 73 and the wavy section 74. Each rib 52 includes wide sections 52a at three positions in the extending direction of the rib 52. In the present embodiment, the wide sections 52a are each located between parts of the wavy section 73 and the wavy section 74 that respectively include an apex V1 and an apex V2.

As shown in FIGS. 2 to 5, the wavy section 73 of each first groove passage 71 includes two first contiguous sections 75, which are contiguous to the wide sections 52a in the third direction Z, and a third contiguous section 77. The first contiguous sections 75 and the third contiguous section 77 alternate in the extending direction of the wavy section 73. That is, the single third contiguous section 77 is located between the first contiguous sections 75 (refer to FIG. 2).

Figure 6:
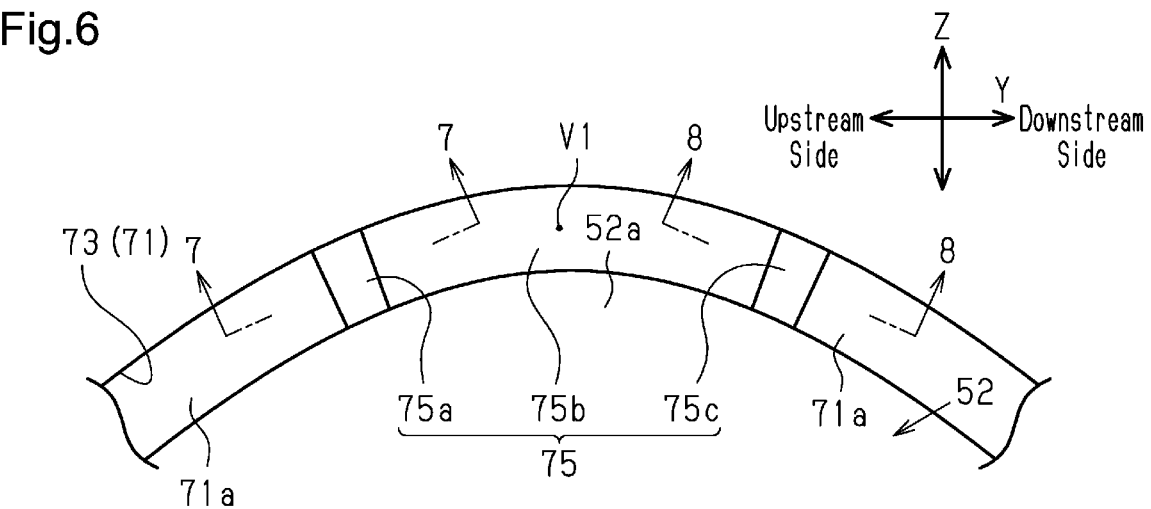
FIG. 6 is an enlarged plan view of the separator shown in FIG. 2, illustrating a first contiguous section of a first groove passage.
Figure 7:
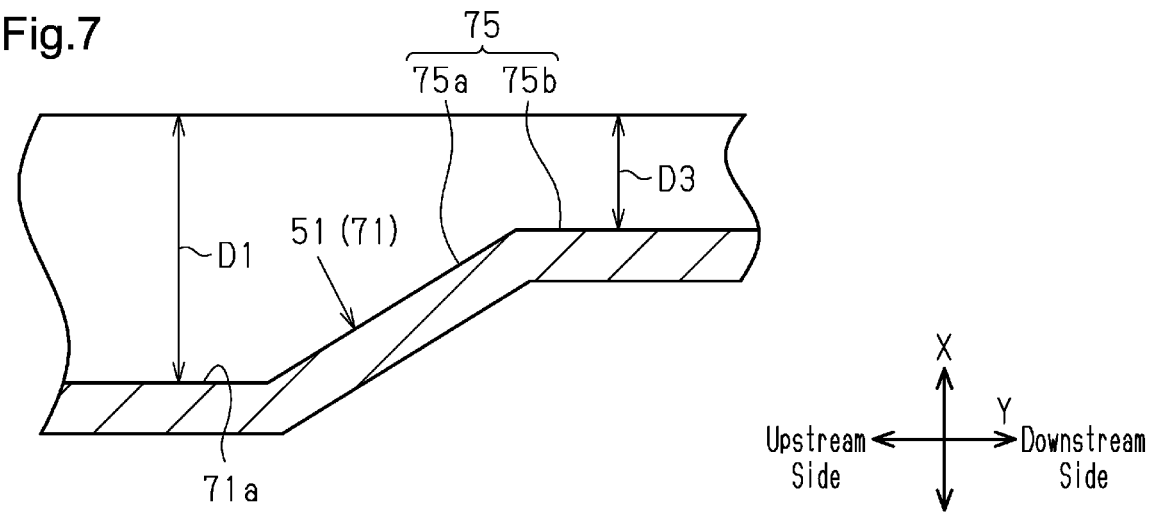
FIG. 7 is a cross-sectional view taken along line 7-7 of FIG. 6.
Figure 8:
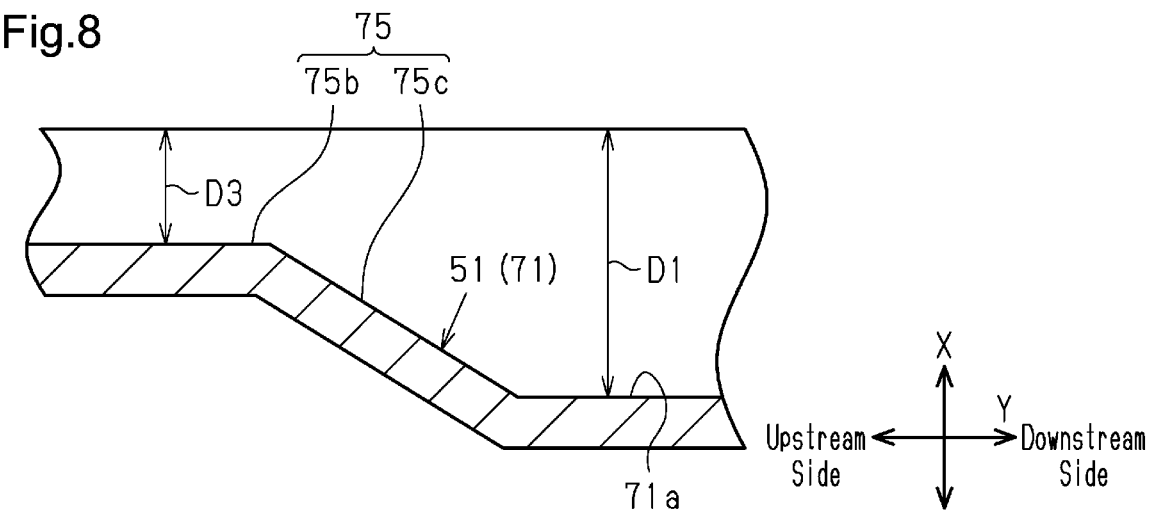
FIG. 8 is a cross-sectional view taken along line 8-8 of FIG. 6.

As shown in FIGS. 6 to 8, a depth D3 of a portion of each recess 51 that includes the first contiguous section 75 is less than a depth D1 of the recess 51 at portions of the first groove passage 71 other than the contiguous sections 75, 77 (hereinbelow, referred to as general sections 71a) (D3<D1). That is, the cross-sectional flow area of the first contiguous section 75 is less than the cross-sectional flow area of the general section 71a. In the present embodiment, the depth D1, that is, the cross-sectional flow area, of each general section 71a is constant over the entire general section 71a in the extending direction.

The first contiguous section 75 includes an upstream-side gradual change section 75a, of which the depth D3 increases toward the upstream side, and a downstream-side gradual change section 75c, of which the depth D3 increases toward the downstream side.

Also, the first contiguous section 75 includes a middle section 75b, which is located between the upstream-side gradual change section 75a and the downstream-side gradual change section 75c. The depth D3 of the middle section 75b is constant over the entire middle section 75b in the extending direction. The depth D3 of the middle section 75b is the minimum value of the depth D3 of each first contiguous section 75.

In each first groove passage 71, the recess 51 includes multiple portions that respectively form the first contiguous sections 75. As shown in FIGS. 3 and 5, the first groove passages 71 are configured such that the minimum value of the depth D3 of those portions is smaller in any of the first contiguous sections 75 than those in the other first contiguous sections 75 on the upstream side. That is, the first groove passages 71 are configured such that the minimum value of the cross-sectional flow area of any of the first contiguous sections 75 is smaller than those of the other first contiguous sections 75 on the upstream side.

As shown in FIG. 4, the depth of a portion of each recess 51 that includes the third contiguous section 77 is the same as the depth D1 of the recess 51 that includes the general section 71a. That is, the cross-sectional flow area of the third contiguous section 77 is the same as the cross-sectional flow area of the general section 71a.

As shown in FIGS. 2 to 5, the wavy section 74 of each second groove passage 72 includes two second contiguous sections 76, which are contiguous to the wide sections 52a in the third direction Z, and a fourth contiguous section 78. The second contiguous sections 76 and the fourth contiguous section 78 alternate in the extending direction of the wavy section 74. That is, the single fourth contiguous section 78 is located between the second contiguous sections 76 (refer to FIG. 2).

The depth of a portion of each recess 51 that includes the second contiguous section 76 is the same as a depth D2 of portions of the second groove passage 72 other than the contiguous sections 76, 78 (hereinbelow, referred to as general sections 72a). That is, the cross-sectional flow area of the second contiguous section 76 is the same as the cross-sectional flow area of the general section 72a. In the present embodiment, the depth D2, that is, the cross-sectional flow area, of each general section 72a is constant over the entire general section 72a in the extending direction.

Figure 9:
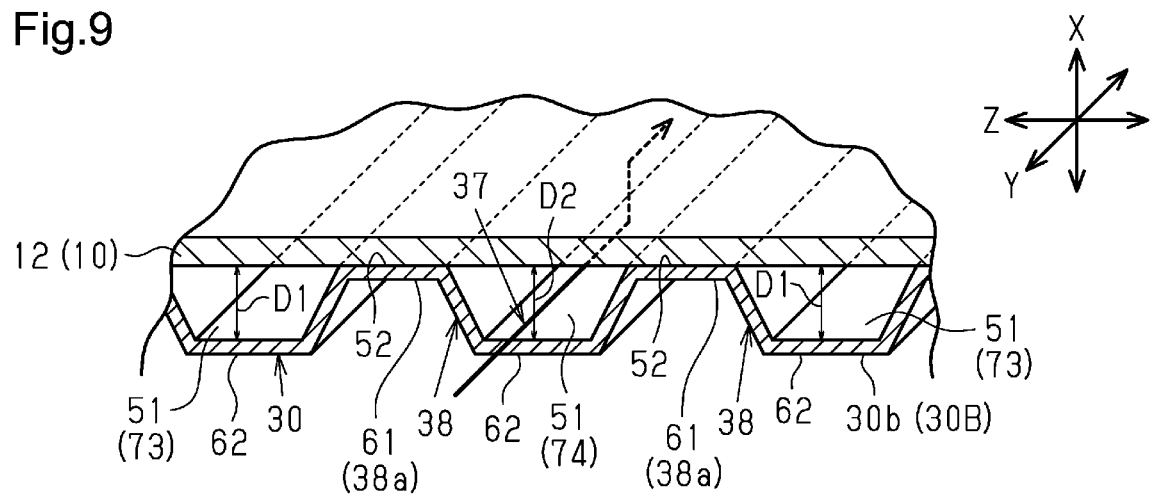
FIG. 9 is a cross-sectional view illustrating a flow of fuel gas that permeates into a gas diffusion layer from a groove passage of the separator shown in FIG. 2.

The depth D2 is the same as the depth D1 (D2=D1, refer to FIG. 9). That is, the cross-sectional flow areas of the general section 72a and the second contiguous section 76 are the same as the cross-sectional flow areas of the general section 71a and the third contiguous section 77 of the first groove passage 71.

Also, the depth D3 is less than the depth D2 (D3<D2, refer to FIGS. 3 and 5). That is, the cross-sectional flow area of the first contiguous section 75 is less than the cross-sectional flow area of the second contiguous section 76.

The depth D4 of a portion of each recess 51 that includes the fourth contiguous section 78 is less than the depth D2 of the recess 51 at the general section 72a (D4<D2). That is, the cross-sectional flow area of the fourth contiguous section 78 is less than the cross-sectional flow area of the general section 72a. In the present embodiment, the depth D4 is less than the depth D1 (D4<D1, refer to FIG. 4). That is, the cross-sectional flow area of the fourth contiguous section 78 is smaller than the cross-sectional flow area of the third contiguous section 77.

As shown in FIG. 2, the groove passages 37 include an outer side groove passage 37A, which is located at the outermost position in the third direction Z. The outer side groove passage 37A includes sections that are located outside the outer edge of the contact surface 30a in the third direction Z.

As shown in FIG. 1, the groove passages 38 connect the through-hole 33 and the through-hole 34 to each other. The groove passages 38 are provided in the second surface 30B. In the groove passages 38, cooling medium flows in a direction opposite to the flow direction of the fuel gas flowing through the groove passages 37.

As shown in FIGS. 3 to 5, the groove passages 38 include wavy sections 38a. The wavy sections 38a are provided in a surface 30*b* on a side opposite to the contact surface 30*a* and extend in wavy shapes in planar directions of the surface 30*b*. The wavy sections 38*a* include recesses 61 formed in the second surface 30B of the separator 30. Ribs 62, which are protrusions, are provided between the recesses 61. The back side of each rib 62 is the recess 51 that includes the wavy sections 73, 74 of each groove passage 37. Likewise, the back side of each rib 52 is the recess 61 that includes the wavy section 38*a* of each groove passage 38. That is, the shapes of protrusions and recesses of the wavy sections 38*a* in the groove passages 38 and the shapes of recesses and protrusions of the wavy sections 73, 74 in the groove passages 37 conform to each other.

<Separator 40>

As shown in FIG. 1, the separator 40 is a rectangular plate elongated in the second direction Y.

The separator 40 is formed by pressing, for example, a metal member made of titanium or stainless steel.

The separator 40 is provided on the side of the MEA 10 on which the cathode 11A is provided. The separator 40 includes a first surface 40A and a second surface 40B, which is on a side opposite to the first surface 40A. The first surface 40A includes a contact surface, which contacts the MEA 10.

The separator 40 includes through-holes 41, 42, 43, 44, 45, 46, which are respectively part of the holes 91, 92, 93, 94, 95, 96. In the third direction Z, the through-holes 41, 44, 46 are provided at positions that correspond to the through-holes 21, 24, 26 of the frame member 20. Also, in the third direction Z, the through-holes 42, 43, 45 are provided at positions that correspond to the through-holes 22, 23, 25 of the frame member 20.

As shown in FIG. 1, the separator 40 includes groove passages 47 through which oxidant gas flows and groove passages 48 through which cooling medium flows. FIG. 1 illustrates, in a simplified manner, the outer edge of a portion in the separator 40 that includes the groove passages 47 and the outer edge of a portion in the separator 40 that includes the groove passages 48.

The groove passages 47 connect the through-hole 45 and the through-hole 46 to each other. In the groove passages 47, the oxidant gas flows in a direction opposite to the flow direction of the fuel gas flowing through the groove passages 37.

The groove passages 48 connect the through-hole 43 and the through-hole 44 to each other. In the groove passages 48, the cooling medium flows in the same direction as the flow direction of the oxidant gas flowing through the groove passages 47.

Operation of the present embodiment will now be described.

Figure 10:
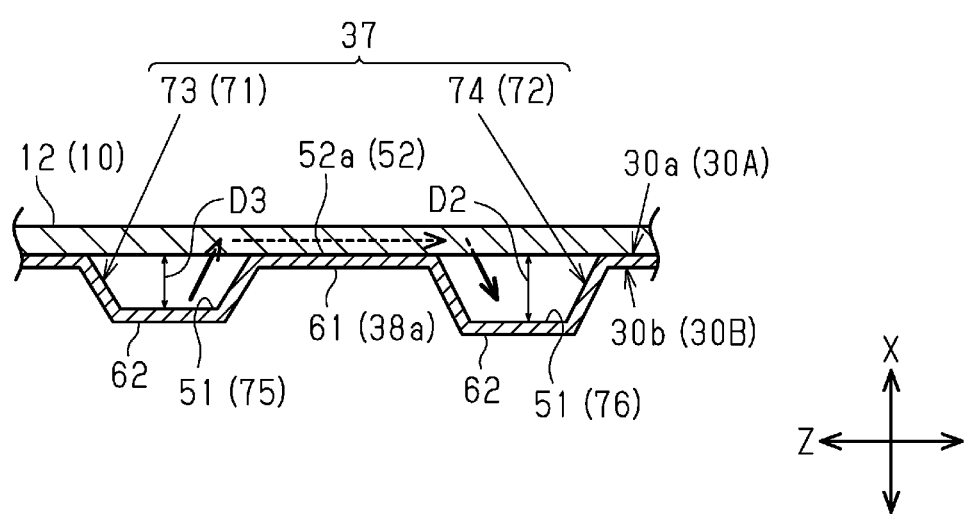
FIG. 10 is a cross-sectional view illustrating a flow of fuel gas that permeates into the gas diffusion layer from a groove passage of the separator shown in FIG. 2.

Arrows in FIGS. 9 and 10 indicate the flow of fuel gas that permeates into the GDL 12 from the groove passages 37.

As shown in FIG. 9, in the process of flowing through the groove passage 37 of the separator 30, the fuel gas gradually permeates into the MEA 10, which is contiguous to the separator 30. More specifically, the fuel gas permeates into the GDL 12 of the MEA 10.

Also, with reference to FIG. 10, a portion of each groove passage 37 that has a small cross-sectional flow area has a greater pressure loss of the fuel gas flowing through that portion than a portion of a large cross-sectional flow area.

The configuration of the present embodiment creates a difference in the pressure loss of fuel gas between the first contiguous section 75 of the first groove passage 71 and the second contiguous section 76 of the second groove passage 72. Thus, some of the fuel gas that is flowing through the first contiguous section 75, which has a greater pressure loss than the second contiguous section 76, permeates into the GDL 12 and flows to the second contiguous section 76, which has a smaller pressure loss than the first contiguous section 75.

Although not illustrated, there is a difference in the pressure loss of fuel gas between the third contiguous section 77 of the first groove passage 71 and the fourth contiguous section 78 of the second groove passage 72. Thus, some of the fuel gas that is flowing through the fourth contiguous section 78, which has a greater pressure loss than the third contiguous section 77, permeates into the GDL 12 and flows to the third contiguous section 77, which has a smaller pressure loss than the fourth contiguous section 78.

The present embodiment has the following advantages.

(1) The groove passages 37 include the first groove passages 71 and the second groove passages 72, which are adjacent to each other in the third direction Z. The first groove passages 71 and the second groove passages 72 include the wavy sections 73, 74, which extend in a wavy shape in planar directions of the contact surface 30*a*. The contact surface 30*a* includes the ribs 52, which are located between the first groove passages 71 and the second groove passages 72 and contact the GDL 12 of the MEA 10. Between the wavy section 73 and the wavy section 74, each rib 52 includes the wide section 52*a*, of which the width W in the third direction Z is greater than those of other sections. The wavy section 73 of the first groove passage 71 includes the first contiguous sections 75, which are contiguous to the wide sections 52*a*. The wavy section 74 of the second groove passage 72 includes the second contiguous sections 76, which are contiguous to the wide sections 52*a*. The cross-sectional flow area of the first contiguous section 75 is less than the cross-sectional flow area of the second contiguous section 76.

This configuration operates in the above-described manner. In the portions of the GDL 12 that contact the wide sections 52*a*, the distance between the groove passages 71, 72 is greater than other portions, such that fuel gas tends to be insufficient in those portions. The operation of the present embodiment, which is described above, allows fuel gas to permeate into such portions.

Accordingly, fuel gas permeates effectively into a wider area of the GDL 12.

(2) The first contiguous section 75 includes the upstream-side gradual change section 75*a*, of which the cross-sectional flow area increases toward the upstream side, the downstream-side gradual change section 75*c*, of which the cross-sectional flow area increases toward the downstream side, and the middle section 75*b* located between the upstream-side gradual change section 75*a* and the downstream-side gradual change section 75*c*. The cross-sectional flow area of the middle section 75*b* is constant over the entire middle section 75*b* in the extending direction.

With this configuration, a portion in the first groove passage 71 that is on the upstream side of the first contiguous section 75 is connected to the middle section 75*b* by the upstream-side gradual change section 75*a*. Also, a portion in the first groove passage 71 that is on the downstream side of the first contiguous section 75 is connected to the middle section 75*b* by the downstream-side gradual change section 75*c*. This restricts the pressure loss of fuel gas from increasing abruptly when the fuel gas flows into the first contiguous section 75 or flows out of the first contiguous section 75. Accordingly, the present embodiment restricts the flow velocity of the fuel gas flowing through the first contiguous section 75 from dropping, while increasing the pressure loss in the first contiguous section 75.

(3) Each rib 52 includes the wide sections 52a at multiple positions in the extending direction of the rib 52. The wavy section 73 of each first groove passage 71 includes the first contiguous sections 75. The wavy section 74 of each second groove passage 72 includes the second contiguous sections 76. The cross-sectional flow area of each first contiguous section 75 is less than the cross-sectional flow area of the second contiguous section 76 that is contiguous to the first contiguous section 75 with the corresponding wide section 52a between them.

This configuration achieves the operational advantage of item (1) at multiple positions in the flow direction of the fuel gas. Accordingly, the fuel gas permeates effectively into a wider area of the GDL 12.

(4) In the recess 51, the minimum value of the cross-sectional flow area of any of the first contiguous sections 75 is smaller than those of the other first contiguous sections 75 on the upstream side.

In the recess 51 of this configuration, the pressure loss of fuel gas in any of the first contiguous sections 75 is greater than that in the other first contiguous sections 75 on the upstream side. Accordingly, permeation of the fuel gas into the GDL 12 is more promoted toward the downstream side, at which the flow rate of the fuel gas flowing into the first groove passages 71 decreases. This configuration thus effectively limits reduction in the amount of the fuel gas that permeates into the GDL 12.

(5) The wavy section 73 of each first groove passage 71 includes the third contiguous section 77, which is contiguous to the corresponding wide section 52a. The wavy section 74 of each second groove passage 72 includes the fourth contiguous section 78, which is contiguous, in the third direction Z, to the third contiguous section 77 with the corresponding wide section 52a between them. The cross-sectional flow area of the fourth contiguous section 78 is less than the cross-sectional flow area of the third contiguous section 77.

For example, if the first contiguous section 75 and the second contiguous section 76 were respectively contiguous to the wide sections 52a, the following problems may occur. The fuel gas flowing through each first groove passage 71 would flow into the second groove passage 72 via the GDL 12 over the entire first groove passage 71 in the extending direction. This would reduce the amount of fuel gas that permeates into the GDL 12 in the downstream portion of the flow of fuel gas in the first groove passage 71. This may reduce power generation in the downstream portion.

In this regard, the above-described configuration allows the fuel gas flowing through the fourth contiguous section 78 to flow to the third contiguous section 77 via the GDL 12. This restricts the flow of fuel gas that permeates into the GDL 12 from the groove passage from being concentrated in the first groove passage 71. This configuration thus limits reduction in the amount of fuel gas that permeates into the GDL 12 in the downstream portion of each first groove passage 71.

(6) The first contiguous sections 75 and the third contiguous section 77 alternate in the extending direction of the wavy section 73. The second contiguous sections 76 and the fourth contiguous section 78 alternate in the extending direction of the wavy section 74.

With this configuration, the amount of fuel gas that permeates into the GDL 12 from the first groove passage 71 in the flow direction of the fuel gas is equalized with the amount of fuel gas that permeates into the GDL 12 from the second groove passage 72. This configuration thus limits reduction in the amount of fuel gas that permeates into the GDL 12 in the downstream portion of each groove passage 37.

(7) The first groove passages 71 and the second groove passages 72 are independent from each other.

For example, if the first groove passage 71 and the second groove passage 72 were connected to each other, the dynamic pressure of fuel gas flowing through the groove passages 71, 72 would be equalized at the connected portion. It thus would be difficult to adjust the pressure loss of the fuel gas by differentiating the cross-sectional flow area between the first groove passage 71 and the second groove passage 72.

In this regard, the first groove passages 71 and the second groove passages 72 are independent from each other in the above-described configuration. Accordingly, it is easy to adjust the pressure loss of fuel gas in the first groove passage 71 and the second groove passage 72.

(8) The groove passages 37 include the first groove passages 71 and the second groove passages 72. The first groove passages 71 and the second groove passages 72 alternate in the third direction Z.

This configuration achieves the operational advantage of item (1) in all the groove passages 37. Accordingly, the fuel gas permeates effectively into a wider area of the GDL 12.

(9) The groove passages 37 include the outer side groove passage 37A, which is located at the outermost position in the third direction Z. The outer side groove passage 37A includes sections that are located outside the outer edge of the contact surface 30a in the third direction Z.

No groove passage 37 exists outside the outer side groove passage 37A in the third direction Z. Thus, if the entire outer side groove passage 37A were located inside the contact surface 30a in the third direction Z, it would be difficult to cause fuel gas to permeate into a section of the GDL 12 that is on the outer side of the outer side groove passage 37A by using a difference in the pressure loss of fuel gas described above. This would reduce the power generation efficiency.

In this regard, the above-described configuration reduces the ratio of the section of the GDL 12 that is located on the outer side of the outer side groove passage 37A. This allows fuel gas to permeate into a wider area of the GDL 12. The power generation efficiency is therefore improved.

<Modifications>

The above-described embodiment may be modified as follows. The above-described embodiment and the following modifications can be combined as long as the combined modifications remain technically consistent with each other.

The shapes of the inlet holes 91, 93, 95 and the outlet holes 92, 94, 96 are not limited to a rectangular shape in plan view as in the above-described embodiment. For example, the shapes of the inlet holes 91, 93, 95 and the outlet holes 92, 94, 96 may be square or stadium-shaped in plan view.

The flows of the reactant gas through the holes 91, 92, 93, 94, 95, 96 are not limited to those described in the above-described embodiment. For example, the hole 96 may be used as an inlet hole for oxidant gas, and the hole 95 may be used as an outlet hole for the oxidant gas. Accordingly, the hole 94 may be used as an inlet hole for cooling medium, and the hole 93 may be used as the outlet hole for the cooling medium. That is, the oxidant gas that flows through the groove passages 47 and the cooling medium that flows through the groove passages 38, 48 may flow in the same direction as the fuel gas flowing through the groove passages 37.

The number of the groove passages 37 is not limited to six as described in the above-described embodiment, but may be less than or greater than six.

The groove passages 37 do not necessarily need to be configured such that the outer side groove passage 37A includes sections that are located outside the outer edge of the contact surface 30*a* in the third direction Z as described in the above-described embodiment. For example, the outer side groove passage 37A may be located at the same position as or on the inner side of the outer edge of the contact surface 30*a* in the third direction Z.

The groove passages 37 do not necessarily include the first groove passages 71 and the second groove passages 72. For example, as long as the groove passages 37 include at least one first groove passage 71 and at least one second groove passage 72 that are adjacent to each other, the groove passages 37 may include additional groove passages different from the first groove passage 71 or the second groove passage 72.

The first groove passages 71 and the second groove passages 72 do not necessarily need to be independent from each other as described in the above-described embodiment. For example, the first groove passage 71 and the second groove passage 72 may be connected to each other by another groove passage that extends in the third direction Z.

The first groove passage 71 does not necessarily need to be configured such that the first contiguous section 75 and the third contiguous section 77 alternate as in the above-described embodiment. Instead, the arrangement of the contiguous sections 75, 77 may be changed. For example, the first groove passage 71 may be configured such that the first contiguous sections 75 are arranged in series. In this case, it suffices if the second contiguous sections 76 are located at positions in the second groove passage 72 that correspond to the first contiguous section 75.

The number of the third contiguous section 77 is not limited to one as described in the above-described embodiment, but may be more than one. The number of the fourth contiguous sections 78 may be changed accordingly. Also, the third contiguous section 77 and the fourth contiguous sections 78 may be omitted. In this case, the first contiguous sections 75 and the second contiguous sections 76 may be provided in correspondence with the respective wide sections 52*a*.

In the recess 51, the minimum value of the cross-sectional flow area of any of the first contiguous sections 75 does not necessarily need to be smaller than those of the other first contiguous sections 75 on the upstream side as in the above-described embodiment. For example, in the recess 51, the minimum value of the cross-sectional flow area of any of the first contiguous sections 75 may be larger than those of the other first contiguous sections 75 on the upstream side.

The downstream-side gradual change section 75*c* may be omitted from the first contiguous section 75. In this case, the portion of the first groove passage 71 that is on the downstream side of the first contiguous section 75 may be directly coupled to the middle section 75*b*.

The upstream-side gradual change section 75*a* may be omitted from the first contiguous section 75. In this case, the portion of the first groove passage 71 that is on the upstream side of the first contiguous section 75 may be directly coupled to the middle section 75*b*.

Figure 11:
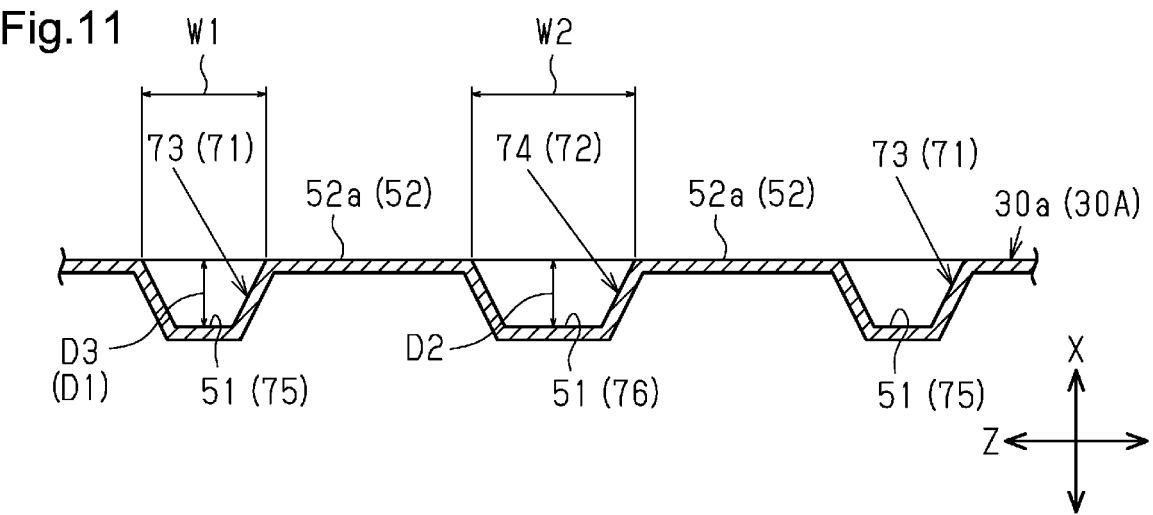
FIG. 11 is a cross-sectional view showing groove passages according to a modification.

When the cross-sectional flow area of the first contiguous section 75 is made less than the cross-sectional flow area of the second contiguous section 76, the first contiguous section 75 may be changed in the following manner. As shown in FIG. 11, a width W1 of a portion of the recess 51 that includes the first contiguous section 75 may be less than a width W2 of a portion of the recess 51 that includes the second contiguous section 76 (W1<W2). In this case, the depth D3 of the first contiguous section 75 may be the same as the depth D1 of other portions of the first groove passage 71 and the depth D2 of the second groove passage 72 (D3=D1, D2, refer to FIG. 11). Alternatively, the depth D3 may be less than the depths D1, D2 (D3<D1, D2).

The first groove passage 71 and the second groove passage 72 do not necessarily need to be configured such that the cross-sectional flow areas of the general section 71*a* and the general section 72*a* are constant over the entire general sections 71*a*, 72*a* in the extending direction as described in the above-described embodiment. For example, one of the general sections 71*a*, 72*a* may have a middle portion in the extending direction at which the cross-sectional flow area is reduced. Alternatively, both of the general sections 71*a*, 72*a* may have a middle portion in the extending direction at which the cross-sectional flow area is reduced. In this case, the portion of the general section 71*a* having the reduced cross-sectional flow area and the portion of the general section 72*a* having the reduced cross-sectional flow area are not adjacent to each other in the third direction Z.

This configuration creates a significant difference in the pressure loss of fuel gas between the general section 71*a* of the first groove passage 71 and the general section 72*a* of the second groove passage 72. Thus, some of the fuel gas that is flowing through one of the general section 71*a* and the general section 72*a* that has a larger pressure loss permeates into the GDL 12 and flows toward one of the general section 71*a* and the general section 72*a* that has a smaller pressure loss. Accordingly, fuel gas permeates into a wider area of the GDL 12.

The first groove passage 71 is not limited to the one described in the above-described embodiment, of which the cross-sectional flow area of each first contiguous section 75 is less than the cross-sectional flow area of the second contiguous section 76 that is contiguous to the first contiguous section 75 with the corresponding wide section 52*a* between them. That is, the first groove passage 71 may be modified as long as the first contiguous sections 75 include one first contiguous section 75 of which the cross-sectional flow area is less than the cross-sectional flow area of the second contiguous section 76 that is contiguous to the first contiguous section 75 with the wide section 52*a* between them.

The shapes of the first groove passage 71 and the second groove passage 72 are not limited to those in the above-described embodiment, but may be changed. For example, the wavelength λ, the amplitude A, and the wavenumber of the wavy sections 73, 74 may be changed as long as the rib 52 located between the first groove passage 71 and the second groove passage 72 includes at least one wide section 52*a* in the flow direction of fuel gas. In this case, the wide section 52*a* does not necessarily need to be located between portions that include the apex V1 and the apex V2 of the wavy sections 73, 74 in the above-described embodiment.

The separator for a fuel cell according to the present disclosure is not limited to the separator 30, which is joined to the side of the MEA 10 that corresponds to the anode 11B as in the above-described embodiment, but may be employed in the separator 40, which is joined to the side corresponding to the cathode 11A.

The separators 30, 40 do not necessarily need to be formed by pressing a metal member, but may be formed by cutting or etching.

The material for the separators 30, 40 is not limited to titanium or stainless steel, but may be aluminum or carbon.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A separator for a fuel cell, the separator including a contact surface configured to contact a power generating unit of the fuel cell, groove passages through which a reactant gas flows being arranged side by side on the contact surface, wherein
    a direction in which the groove passages are arranged side by side is defined as an arrangement direction,
    a direction in which the reactant gas flows in the groove passages is defined as a flow direction,
    the groove passages include a first groove passage and a second groove passage that extend in wavy shapes in planar directions of the contact surface and are adjacent to each other in the arrangement direction,
    the contact surface includes a rib that is located between the first groove passage and the second groove passage and contacts the power generating unit,
    the rib includes at least one wide section of which a width in the arrangement direction is greater than those of other sections of the rib in the flow direction,
    the first groove passage includes at least one first contiguous section that is contiguous to the at least one wide section,
    the second groove passage includes at least one second contiguous section that is contiguous to the at least one wide section,
    a cross-sectional flow area of the first contiguous section is less than a cross-sectional flow area of the second contiguous section, and
    an outer side groove passage that is the groove passage located at an outermost position in the arrangement direction includes a section that is located, in the arrangement direction, on an outer side of an outer edge of the contact surface.

2. The separator for the fuel cell according to claim 1, wherein
    an upstream side and a downstream side in the flow direction are defined as an upstream side and a downstream side, respectively, and
    the first contiguous section includes:
    an upstream-side gradual change section of which a cross-sectional flow area increases toward the upstream side;
    a downstream-side gradual change section of which a cross-sectional flow area increases toward the downstream side; and
    a middle section that is located between the upstream-side gradual change section and the downstream-side gradual change section, a cross-sectional flow area of the middle section being constant in the flow direction.

3. The separator for the fuel cell according to claim 1, wherein the first groove passage and the second groove passage are independent from each other.

4. The separator for the fuel cell according to claim 1, wherein
    the first groove passage is one of first groove passages,
    the second groove passage is one of second groove passages, and
    the first groove passages and the second groove passages alternate in the arrangement direction.

* * * * *